US010532327B2

(12) United States Patent
Yoon

(10) Patent No.: US 10,532,327 B2
(45) Date of Patent: Jan. 14, 2020

(54) METHODS OF CONDITIONING MEMBRANES

(71) Applicant: Ecolab USA Inc., St. Paul, MN (US)

(72) Inventor: Seong-Hoon Yoon, Naperville, IL (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/214,137

(22) Filed: Jul. 19, 2016

(65) Prior Publication Data

US 2017/0021309 A1  Jan. 26, 2017

Related U.S. Application Data

(60) Provisional application No. 62/194,638, filed on Jul. 20, 2015.

(51) Int. Cl.

| B01D 65/10 | (2006.01) |
| B01D 61/04 | (2006.01) |
| B01D 61/02 | (2006.01) |
| B01D 65/08 | (2006.01) |
| C02F 101/14 | (2006.01) |
| C02F 1/00 | (2006.01) |
| C02F 1/44 | (2006.01) |
| C02F 5/10 | (2006.01) |
| C02F 103/04 | (2006.01) |
| C02F 103/02 | (2006.01) |

(52) U.S. Cl.
CPC ........... *B01D 65/10* (2013.01); *B01D 61/027* (2013.01); *B01D 61/04* (2013.01); *B01D 65/08* (2013.01); *C02F 1/008* (2013.01); *C02F 1/441* (2013.01); *C02F 1/442* (2013.01); *C02F 5/10* (2013.01); *B01D 2311/04* (2013.01); *B01D 2311/12* (2013.01); *B01D 2321/168* (2013.01); *C02F 2101/14* (2013.01); *C02F 2103/023* (2013.01); *C02F 2103/04* (2013.01); *C02F 2209/00* (2013.01); *C02F 2209/003* (2013.01); *C02F 2303/20* (2013.01); *C02F 2303/22* (2013.01); *C02F 2305/00* (2013.01)

(58) Field of Classification Search
None
See application file for complete search history.

(56) References Cited

U.S. PATENT DOCUMENTS

| 3,647,521 | A | * | 3/1972 | Tulin | ............... B01D 61/08 427/238 |
|---|---|---|---|---|---|
| 5,352,273 | A | | 10/1994 | Simmons et al. | |
| 5,435,969 | A | | 7/1995 | Hoots et al. | |
| 6,312,644 | B1 | | 11/2001 | Moriarty et al. | |
| 6,645,428 | B1 | | 11/2003 | Morris et al. | |
| 6,730,227 | B2 | | 5/2004 | Zeiher et al. | |
| 6,821,428 | B1 | | 11/2004 | Zeiher et al. | |
| 6,838,001 | B2 | | 1/2005 | Zeiher et al. | |
| 6,838,002 | B2 | | 1/2005 | Zeiher et al. | |
| 6,872,312 | B1 | | 3/2005 | Shah et al. | |
| 7,410,525 | B1 | | 8/2008 | Liu et al. | |
| 7,758,751 | B1 | | 7/2010 | Liu et al. | |
| 8,585,964 | B2 | | 11/2013 | Sotoudeh et al. | |
| 2003/0183575 | A1 | | 10/2003 | Zeiher et al. | |
| 2004/0018583 | A1 | | 1/2004 | Ho et al. | |
| 2004/0118776 | A1 | | 6/2004 | Zeiher et al. | |
| 2004/0132195 | A1 | | 7/2004 | Kelle Zeiher et al. | |
| 2004/0168980 | A1 | * | 9/2004 | Musale | ............... B01D 61/04 210/639 |
| 2004/0185472 | A1 | | 9/2004 | Kelle Zeiher et al. | |
| 2005/0025659 | A1 | | 2/2005 | Godfrey et al. | |
| 2006/0160226 | A1 | | 7/2006 | Johnson | |
| 2006/0246595 | A1 | | 11/2006 | Banks et al. | |
| 2007/0015678 | A1 | * | 1/2007 | Rodrigues | ............... C02F 5/02 510/320 |
| 2008/0190861 | A1 | | 8/2008 | Branning | |
| 2009/0101587 | A1 | | 4/2009 | Blokker et al. | |
| 2010/0038306 | A1 | | 2/2010 | Livingston et al. | |
| 2011/0189469 | A1 | | 8/2011 | Stenzel et al. | |
| 2012/0112097 | A1 | | 5/2012 | Lee et al. | |
| 2013/0075331 | A1 | | 3/2013 | Peiris et al. | |
| 2014/0251897 | A1 | | 9/2014 | Livingston et al. | |
| 2015/0001139 | A1 | | 1/2015 | Cohen et al. | |

(Continued)

FOREIGN PATENT DOCUMENTS

| JP | 4058657 B2 | 3/2008 |
| JP | 4586977 B2 | 11/2010 |
| KR | 101159076 B1 | 7/2012 |

(Continued)

OTHER PUBLICATIONS

European Patent Office, International Search Report in International Patent Application No. PCT/US2016/042980, dated Oct. 18, 2016, 5 pp.
European Patent Office, Written Opinion in International Patent Application No. PCT/US2016/042980, dated Oct. 18, 2016, 6 pp.
Frenkel et al., "New Techniques for Real-Time Monitoring of Membrane Integrity for Virus Removal: Pulsed-Marker Membrane Integrity Monitoring System," WateReuse Research Foundation, Alexandria, VA, 2014, 104 pp.
Kitis et al., "Microbial removal and integrity monitoring of RO and NF membranes," *Journal AWWA*, 95(12), Dec. 2003, pp. 105-119.
Lozier et al., "Microbial Removal and Integrity Monitoring of High-Pressure Membranes," Awwa Research Foundation, Denver, CO, 2003, 220 pp.
Surawanviji, "Real-Time Monitoring of Reverse Osmosis Membrane Integrity," Univ. of California, Proquest Dissertations Publishing, 2015, 2 pp.

*Primary Examiner* — Bradley R Spies
(74) *Attorney, Agent, or Firm* — Leydig Voit and Mayer, Ltd.

(57) ABSTRACT

Methods of conditioning a membrane utilized for water purification are provided. The methods monitor membrane performance during water purification or membrane conditioning via fluorometric measurement. The monitoring allows for the detection of removal efficiency of the fluorescing substance. A conditioner is introduced in the feed stream to increase the detected removal efficiency of a fluorescing substance by the membrane. The conditioner generally extends the useful life of the membrane being conditioned.

16 Claims, 1 Drawing Sheet

(56) References Cited

U.S. PATENT DOCUMENTS

2015/0306545 A1* 10/2015 Hayakawa ......... B01D 67/0088
 210/636
2016/0046509 A1 2/2016 Ukai et al.

FOREIGN PATENT DOCUMENTS

| WO | WO 03/082447 A1 | 10/2003 | | |
|----|----|----|----|----|
| WO | WO 2005/012397 A2 | 2/2005 | | |
| WO | WO 2005/113121 A1 | 12/2005 | | |
| WO | WO 2013/057492 A1 | 4/2013 | | |
| WO | WO-2014103822 A1 * | 7/2014 | ......... | B01D 67/0088 |

* cited by examiner

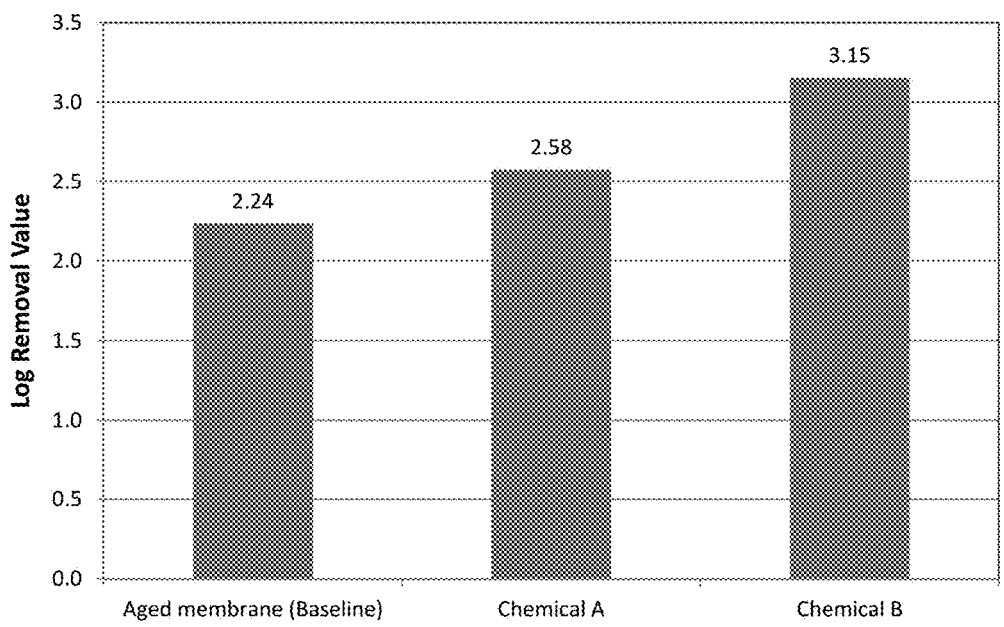

METHODS OF CONDITIONING MEMBRANES

This application is a nonprovisional application claiming the benefit of U.S. Provisional Patent Application No. 62/194,638, filed Jul. 20, 2015, the contents of which are incorporated by reference herein in its entirety.

TECHNICAL FIELD

The present disclosure relates to methods of conditioning membranes.

BACKGROUND

Government entities have been progressively concerned about the quality of water recycled for potable purposes. For example, Orange County, Calif., further treats biologically-treated wastewater via microfiltration, reverse osmosis, and advanced oxidation processes prior to delivering the further treated wastewater into aquifer. Some other entities have skipped the delivery into aquifer and deliver similarly treated water to be blended with potable water. Despite their excellent virus removal capabilities, nanofiltration and reverse osmosis have not been eligible for high log removal value ("LRV") credit, which is due to the inability of previous systems to guarantee delivery of water having a high log removal value (e.g., LRV≥12) of enteric virus.

Furthermore, certain industrial applications use, among other processes, nanofiltration and/or reverse osmosis to purify water utilized in processes that require high purity water. Examples of such processes include, but are not limited to, steam generation (boiler systems), cooling systems, electronic parts manufacture, food production, beverage production, pharmaceutical production, and the like. The methods provided herein help cure these deficiencies, at least in part.

SUMMARY

Methods of conditioning a membrane utilized for water purification are provided. In an embodiment, the method comprises monitoring membrane performance during water purification via fluorometric measurement of a fluorescing substance present in a feed stream and at least one of a permeate stream and a reject stream. The monitoring allows for the detection of removal efficiency of the fluorescing substance. A conditioner is introduced into the feed stream. The conditioner comprises a component that has a weight average molecular weight of from about 1,000 Daltons to about 10,000,000 Daltons and comprises a water soluble polymer, a polymer of biological origin, or a combination thereof. The conditioner is introduced in the feed stream to increase the detected removal efficiency of the fluorescing substance by the membrane.

In another embodiment, the method comprises monitoring membrane performance during water purification via fluorometric measurement of a fluorescing substance present in a feed stream and at least one of a permeate stream and a reject stream. The monitoring allows for the detection of removal efficiency of the fluorescing substance. A conditioner is introduced into the feed stream. The conditioner comprises a precursor that is reacted to form a water soluble polymer that has a weight average molecular weight of from about 1,000 Daltons to about 10,000,000 Daltons. The conditioner is introduced in the feed stream and reacted to increase the detected removal efficiency of the fluorescing substance by the membrane.

In yet another embodiment, the method comprises monitoring membrane performance during water purification via fluorometric measurement of a fluorescing substance present in a feed stream and at least one of a permeate stream and a reject stream. The monitoring allows for the detection of removal efficiency of the fluorescing substance. The detected removal efficiency is compared to a control criterion to determine whether the control criterion is met. If the detected removal efficiency does not meet the control criterion, a conditioner is introduced into the feed stream. The conditioner comprises a component that has a weight average molecular weight of from about 1,000 Daltons to about 10,000,000 Daltons and comprises a water soluble polymer, a polymer of biological origin, or a combination thereof. The conditioner is introduced in the feed stream to increase the detected removal efficiency of the fluorescing substance by the membrane.

In a further embodiment, the method comprises circulating a blend comprising water, a component having a weight average molecular weight of from about 1,000 Daltons to about 10,000,000 Daltons and a fluorescing substance through the membrane, which is done to improve removal efficiency of the fluorescing substance by the membrane. The component comprises a water soluble polymer, a precursor of a water soluble polymer, a polymer of biological origin, or a combination thereof. Membrane performance is monitored via fluorometric measurement during the circulation of the blend by detecting removal efficiency of the fluorescing substance by the membrane. The blend is circulated through the membrane until a control criterion of membrane performance is met. The method may further comprise purifying water using the membrane after the circulation of the blend has been stopped.

BRIEF DESCRIPTION OF THE DRAWINGS

FIG. 1 is a bar graph of the results of the Example provided herein.

DETAILED DESCRIPTION

Methods of conditioning a membrane utilized for water purification are provided. In an embodiment, the method comprises monitoring membrane performance during water purification via fluorometric measurement of a fluorescing substance present in a feed stream and at least one of a permeate stream and a reject stream. The monitoring allows for the detection of removal efficiency of the fluorescing substance. A conditioner is introduced into the feed stream. The conditioner comprises a component that has a weight average molecular weight of from about 1,000 Daltons to about 10,000,000 Daltons and comprises a water soluble polymer, a polymer of biological origin, or a combination thereof. The conditioner is introduced in the feed stream to increase the detected removal efficiency of the fluorescing substance by the membrane.

In another embodiment, the method comprises monitoring membrane performance during water purification via fluorometric measurement of a fluorescing substance present in a feed stream and at least one of a permeate stream and a reject stream. The monitoring allows for the detection of removal efficiency of the fluorescing substance. A conditioner is introduced into the feed stream. The conditioner comprises a precursor that is reacted to form a water soluble polymer that has a weight average molecular weight of from about 1,000 Daltons to about 10,000,000 Daltons. The conditioner is introduced in the feed stream and reacted to increase the detected removal efficiency of the fluorescing substance by the membrane.

In yet another embodiment, the method comprises monitoring membrane performance during water purification via fluorometric measurement of a fluorescing substance present in a feed stream and at least one of a permeate stream and a reject stream. The monitoring allows for the detection of removal efficiency of the fluorescing substance. The detected removal efficiency is compared to a control criterion to determine whether the control criterion is met. If the detected removal efficiency does not meet the control criterion, a conditioner is introduced into the feed stream. The conditioner comprises a component that has a weight average molecular weight of from about 1,000 Daltons to about 10,000,000 Daltons and comprises a water soluble polymer, a polymer of biological origin, or a combination thereof. The conditioner is introduced in the feed stream to increase the detected removal efficiency of the fluorescing substance by the membrane.

In a further embodiment, the method comprises circulating a blend comprising water, a component having a weight average molecular weight of from about 1,000 Daltons to about 10,000,000 Daltons and a fluorescing substance through the membrane, which is done to improve removal efficiency of the fluorescing substance by the membrane. The component comprises a water soluble polymer, a precursor of a water soluble polymer, a polymer of biological origin, or a combination thereof. Membrane performance is monitored via fluorometric measurement during the circulation of the blend by detecting removal efficiency of the fluorescing substance by the membrane. The blend is circulated through the membrane until a control criterion of membrane performance is met. The method may further comprise purifying water using the membrane after the circulation of the blend has been stopped.

The membrane of the present invention is utilized for water purification. In the methods described herein, one or more membranes may be used to purify water, though the methods may recite "membrane" in the singular. In certain embodiments of the methods described herein, the membrane is a microfiltration membrane, an ultrafiltration membrane, a nanofiltration membrane, a reverse osmosis membrane, or a combination thereof. In certain embodiments, the membrane is nonporous, e.g., permeable via solution diffusion. In certain embodiments of the methods described herein, the membrane is a nanofiltration membrane, a reverse osmosis membrane, or a combination thereof.

In certain embodiments of the methods described herein, membrane performance is monitored during water purification via fluorometric measurement, which may comprise fluorometric measurement of the feed stream, the permeate stream, and the reject stream. A feed stream is supplied to the membrane, which separates the feed stream into a permeate stream and a reject stream. In certain embodiments of the methods described herein, membrane performance is monitored by measuring the fluorometric response of the feed stream and comparing the feed stream fluorometric response with at least one of the fluorometric response of the permeate stream and the reject stream. In certain other embodiments of the methods described herein, membrane performance is monitored by measuring the fluorometric response of at least one of the permeate stream and the reject stream to determine concentration of the fluorescing substance, which is then compared to a known concentration of the fluorescing substance in the feed stream.

The term "fluorescing substance" is utilized herein to describe a substance that provides a measurable fluorescent emission upon excitation. The molecular size of the fluorescing substance is smaller than that of enteric viruses and other microbiological contaminants. Therefore, fluorometric measurement of the removal efficiency of the fluorescing substance provides a conservative measurement of the removal efficiency of enteric viruses and other microbiological contaminants. In certain embodiments, the fluorescing substance is an additive in the feed stream present in the feed stream for the purpose of monitoring membrane performance. In other embodiments, the fluorescing substance is present in the conditioner as an additive, a tagged component, or a naturally-fluorescing component. For example, certain water soluble polymer and polymers of biological origin are capable of naturally-fluorescing or of being tagged with a fluorescing moiety, e.g., anthocyanin, coumarin, myricetin, quinone, tannin, carotenoid, flavonol, humic acid, fulvic acid, and combinations thereof.

At least one embodiment is a method of conditioning a membrane that has been in service and has shown degradation that has been measured via fluorometric measurement. Degradation of the membrane is not necessary, as the methods could be performed on new membranes or on membranes that show no degradation. The methods provided herein will be particularly useful as methods of rejuvenating worn membranes, thereby allowing the worn membranes to have extended usefulness.

As described herein, membrane performance can be monitored via fluorometric measurement. Fluorometric measurement can be used to detect removal efficiency, which may be used to trigger membrane conditioning. Membrane conditioning may be achieved by for example, introducing a conditioner into the feed stream (an on-line conditioning method) or by circulating a blend comprising, inter alia, a component such as may be present in a conditioner (an off-line or condition-in-place method). In certain embodiments, the blend comprises a conditioner. The blend should include a component having a molecular weight of from about 1,000 Daltons to about 10,000,000 Daltons, the component comprising a water soluble polymer (and/or precursor thereof), a polymer of biological origin, or a combination thereof.

The component has a weight average molecular weight of from about 1,000 Daltons to about 10,000,000 Daltons. In certain embodiments, the component has a weight average molecular weight of from about 1,000 Daltons to about 10,000,000 Daltons, or to about 5,000,000 Daltons, or to about 2,000,000 Daltons, or to about 1,000,000 Daltons, or to about 500,000 Daltons, or to about 100,000 Daltons.

In certain embodiments of the methods described herein, a conditioner is introduced into the feed stream to increase the detected removal efficiency of the fluorescing substance by the membrane. Though the conditioner can be utilized with new membranes, the conditioner is particularly useful in rejuvenating worn membrane(s). Practicing the methods disclosed herein is intended to extend the useful life of the worn membrane(s) by allowing the worn membrane(s) to continue to provide adequate separation of the fluorescing substance, and, consequently, of impurities that may be present in the feed stream.

The conditioner may comprise, among other substances, a component having a weight average molecular weight of from about 1,000 Daltons to about 10,000,000 Daltons selected from the group consisting of: a water soluble polymer, a precursor of the water soluble polymer (which may be subsequently reacted to form the water soluble polymer), a polymer of biological origin, and combinations thereof. In certain embodiments, the component and the fluorescing substance are a single composition. In certain embodiments, the component is a fluorescently tagged colloid having a mean particle size of from about 10 nm to about 5,000 nm. The colloid may comprise colloidal silica.

In certain embodiments of the methods described herein, the component comprises a water soluble polymer. In certain embodiments, the water soluble polymer does not have a charge. In certain embodiments, the water soluble polymer is a polyelectrolyte. A polyelectrolyte is a composition that is soluble and includes multiple electrolytic charges. The water soluble polymer may be a homopolymer, copolymer, terpolymer, etc. In some embodiments, the water soluble polymer is a combination of a small molecule and a polymer, including a plurality of small molecules and/or a plurality of polymers.

In certain embodiments of the methods described herein, the component comprises a water soluble polymer. In certain embodiments, the water soluble polymer comprises a polyelectrolyte. The polyelectrolyte may comprise a sulfate group, a sulfite group, a sulfide group, a nitrate group, a nitrite group, a carboxylate group, a quaternary amine group, a hydroxyl group, a benzyl group, a derivative thereof, or a combination thereof. In certain embodiments, the polyelectrolyte comprises an amine-comprising salt, an amide-comprising salt, an acrylate-comprising salt, a methacrylate-comprising salt, a vinyl-comprising salt, a halogen-substituted vinyl-comprising salt, a derivative thereof, or a combination thereof. In certain embodiments of the methods described herein, the component comprises a polyacrylamide. In certain embodiments of the methods described herein, the component comprises a polydopamine. In certain embodiments of the methods described herein, the water soluble polymer comprises a polyvinyl halide, a halogen-substituted polyvinyl halide, or a combination thereof. In certain embodiments of the methods described herein, the component comprises polydiallyldimethylammonium chloride. In certain embodiments of the methods described herein, the water soluble polymer comprises N,N'-dimethylaminoethyl (meth)acrylate methyl chloride quaternary salt, N,N'-dimethylaminoethyl (meth)acrylate benzyl chloride quaternary salt, a derivative thereof, or a combination thereof. The term "(meth)acrylate" and like terms is utilized to describe the acrylate, the methacrylate, and combinations thereof. In certain embodiments of the methods described herein, the water soluble polymer comprises a homopolymer. In certain embodiments, the water soluble polymer comprises a copolymer. In certain embodiments of the methods described herein, the water soluble polymer comprises a terpolymer.

In certain embodiments of the methods described herein, the component comprises a polymer of biological origin. A polymer of biological origin is a composition that is generated by a biological entity, which may include, but is not limited to, an organism, an organ, a tissue, a cell, an organelle, and the like. A polymer of biological origin may comprise, e.g., an amino acid, a saccharide, a lipid, a nucleic acid, a polymer thereof, a derivative thereof, or a combination thereof. Examples of polymers of biological origin include, but are not limited to, a protein, ribonucleic acid, deoxyribonucleic acid, a lipid, chitosan, cellulose, methyl cellulose, polymethylcellulose, a saccharide, a polysaccharide, a starch, humic acid, fulvic acid, a precursor thereof, a derivative thereof, or a combination thereof. In certain embodiments of the methods described herein, the component is a cellulose-comprising composition. In certain embodiments of the methods described herein, the cellulose-comprising composition comprises cellulose, a cellulose ether, a cellulose acetate, methyl cellulose, a polymer thereof, a derivative thereof, or a combination thereof. Particularly useful polymers of biological origin that may be utilized in the methods provided include cellulose, a cellulose ether, methyl cellulose, polymethylcellulose, or a combination thereof.

The terms "reacting," "reaction," "reacted," and the like, as they pertain to precursor(s) forming a water soluble polymer, are utilized herein to describe any reaction that forms the water soluble polymer. The reaction may be any chemical reaction that causes one or more precursors to become a water soluble polymer that causes an increase in the detected removal efficiency of the fluorescing substance by the membrane.

In certain embodiments of the methods described herein, the reaction is a polymerization (i.e., a reaction that forms a polymer from monomers). In certain embodiments of the methods described herein, the reaction is interfacial polymerization, which describes polymerization that occurs on a surface, e.g., of the membrane, as opposed to in a dispersion.

In certain embodiments of the methods described herein, the component is at least one of each of a water soluble polymer and a polymer of biological origin, which may be present in the conditioner and/or the blend simultaneously or sequentially.

In certain embodiments of the methods described herein, the water soluble polymer is cross-linked. The water soluble polymer may be cross-linked by cross-linking agents that comprise, e.g., carbon, oxygen, silicon, nitrogen, sulfur, and hydrogen.

In certain embodiments of the methods described herein, the feed stream or the blend comprises from about 1 mg/L to about 10,000 mg/L of the component, which includes from about 1 mg/L, or from about 5 mg/L, or from about 10 mg/L of the component, to about 10,000 mg/L, or to about 1,000 mg/L, or to about 100 mg/L of the component. In certain embodiments of the methods described herein, the feed stream comprises from about 10 mg/L to about 100 mg/L of the component.

In certain embodiments of the methods described herein, the permeate stream is delivered to a steam generating system, which in certain embodiments is a boiler system.

In certain embodiments of the methods described herein, the conditioner is introduced into the feed stream upon instruction from a controller. In certain embodiments of the methods described herein, the method of conditioning the membrane utilized for water purification is an off-line process or a condition-in-place process that is triggered upon instruction from a controller. A controller is an electronic device having components such as a processor, memory device, digital storage medium, cathode ray tube, liquid crystal display, plasma display, touch screen or other monitor, and/or other components. Controllers include, for example, an interactive interface that guides a user, provides prompts to the user, or provides information to the user regarding any portion of the method of the invention. Such information may include, for example, building of calibration models, data collection of one or more parameters, measurement location(s), management of resulting data sets, etc.

The controller is generally operable for integration and/or communication with one or more application-specific integrated circuits, programs, computer-executable instructions or algorithms, one or more hard-wired devices, wireless devices, and/or one or more mechanical devices such as liquid handlers, hydraulic arms, servos, or other devices. Moreover, the controller is operable to integrate feedback, feed-forward, or predictive loop(s) resulting from, inter alia, the parameters measured by practicing the method(s) of the present disclosure. Some or all of the controller system functions may be at a central location, such as a network server, for communication over a local area network, wide area network, wireless network, extranet, the Internet, microwave link, infrared link, and the like, and any combinations of such links or other suitable links. In addition, other components such as a signal conditioner or system monitor may be included to facilitate signal transmission and signal-processing algorithms.

By way of example, the controller, when present, is operable to implement the method of the invention in a semi-automated or fully-automated fashion. In another embodiment, the controller is operable to implement the method in a manual or semi-manual fashion.

Data transmission of any of the measured parameters or signals to a user, chemical pumps, alarms, or other system components is accomplished using any suitable device, such as a wired or wireless network, cable, digital subscriber line, internet, etc. Any suitable interface standard(s), such as an ethernet interface, wireless interface (e.g., IEEE 802.11a/b/g/n, 802.16, Bluetooth, optical, infrared, other radiofrequency, any other suitable wireless data transmission method, and any combinations of the foregoing), universal serial bus, telephone network, the like, and combinations of such interfaces/connections may be used. As used herein, the term "network" encompasses all of these data transmission methods. Any of the components, devices, sensors, etc., herein described may be connected to one another and/or the controller using the above-described or other suitable interface or connection. In an embodiment, information (collectively referring to all of the inputs or outputs generated by the method of the invention) is received from the system and archived. In another embodiment, such information is processed according to a timetable or schedule. In a further embodiment, such information is processed in real-time. Such real-time reception may also include, for example, "streaming data" over a computer network.

In certain embodiments of the methods described herein, the instruction from the controller results from a failure to meet a control criterion. In certain embodiments, the control criterion comprises a setpoint, or range thereof, that indicates removal efficiency of the fluorescing substance. An example of a control criterion is a setpoint or range thereof of the log removal value ("LRV") of the membrane, which can be measured via fluorometric measurement as described herein. LRV can be calculated from removal efficiency ("R"), which is a determination of the removal value of, for example, the fluorescing substance. Determination of the removal efficiency of the fluorescing substance provides a conservative calculation of the removal efficiency of enteric viruses and other microbiological contaminants, as enteric viruses and other microbiological contaminants are larger and, thus, more difficult to pass through a membrane.

$$LRV=-\log(1-R)$$

In certain embodiments of the methods described herein, the control criterion is a log removal value of at least 2. In certain embodiments of the methods described herein, the control criterion is a log removal value of at least 3.

In further embodiments of the methods described herein, the instruction from the controller results from a predicted failure to meet a control criterion. The predicted failure may be the result of trend analysis of a population of data gathered over an operational lifespan, or portion thereof, of a membrane. The trend analysis may be conducted by utilizing one or more of a number of known statistical analysis tools, for example, linear extrapolation, polynomial curve fitting, linear regression, simple regression, least squares analysis, and the like.

The foregoing may be better understood by reference to the following example, which is presented for the purpose of illustration and is not intended to limit the scope of the invention.

EXAMPLE

A Dow NF270 2.5-inch nanofiltration module was used to filter synthetic brine consisting of 1,500 mg/L of sodium chloride dissolved in deionized water. A fluorescing substance, in this case pyrenetetrasulfonic acid, was added to the feed tank (i.e., the feed stream) at 100 mg/L of brine. Fluorometric measurement of the permeate stream was conducted using a Nalco inline fluorometer. Flow rate of the feed stream was maintained at 3.2 gallons per minute at a feed pressure of approximately 35 psig. Generally, new Dow NF270 nanofiltration modules of this kind show approximately a 99.9% rejection (LRV=3) of the fluorescing substance, the module of the present example initially demonstrated a baseline rejection of 99.42% (LRV=2.24) of the fluorescing substance. The baseline rejection is shown in FIG. 1 as "Aged membrane (Baseline)."

To condition the membrane(s) of the module, a conditioner comprising 20 milligrams of polyacrylamide having a molecular weight of 300,000 Daltons (shown as "Chemical A" in FIG. 1) per liter of brine was introduced into the feed stream in addition to the fluorescing substance to form a blend. The polyacrylamide was present in the blend at a concentration of 10 milligrams of polyacrylamide per liter of blend. FIG. 1 shows that the presence of the polyacrylamide increased the rejection of the fluorescing substance from the baseline rejection to 99.74% (LRV=2.58).

Subsequently, 20 milligrams of polymethylcellulose having a molecular weight of 16,000 Daltons (shown as "Chemical B" in FIG. 1) per liter of brine was introduced to the feed stream to form a blend in the absence of polyacrylamide. The polymethylcellulose was present in the blend at a concentration of 10 milligrams of polymethylcellulose per liter of blend. FIG. 1 shows that the presence of the polymethylcellulose further increased the rejection of the fluorescing substance from the previously obtained value of 99.74% (LRV=2.58) to 99.93% (LRV=3.15).

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

All references, including publications, patent applications, and patents, cited herein are hereby incorporated by reference to the same extent as if each reference were individually and specifically indicated to be incorporated by reference and were set forth in its entirety herein.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of conditioning a reverse osmosis or nanofiltration membrane utilized for removing enteric viruses and other microbiological contaminants from water, the method comprising:
    monitoring membrane performance during water purification via fluorometric measurement of a fluorescing substance present in a feed stream and at least one of a permeate stream and a reject stream to detect removal efficiency of the fluorescing substance;
    introducing into the feed stream a first conditioner, which is a water soluble polymer selected from polyacrylamide and polyelectrolytes having a sulfate group, a sulfite group, a sulfide group, a nitrate group, a nitrite group, a carboxylate group, a quaternary amine group, or a benzyl group;
    and subsequently
    introducing a second conditioner having an active ingredient selected from the group consisting of: cellulose, a cellulose ether, methyl cellulose, polymethylcellulose, or a combination thereof, and having a weight average molecular weight of from about 1,000 Daltons to about 10,000,000 Daltons into the feed stream to increase the detected removal efficiency of the fluorescing substance by the membrane.

2. A method of conditioning a reverse osmosis or nanofiltration membrane utilized for removing enteric viruses and other microbiological contaminants from water, the method comprising:
    monitoring membrane performance during water purification via fluorometric measurement of a fluorescing substance present in a feed stream and at least one of a permeate stream and a reject stream to detect removal efficiency of the fluorescing substance;
    determining whether the detected removal efficiency meets a control criterion; and
    if the detected removal efficiency does not meet the control criterion,
    introducing into the feed stream a first conditioner, which is a water soluble polymer selected from polyacrylamide and polyelectrolytes having a sulfate group, a sulfite group, a sulfide group, a nitrate group, a nitrite group, a carboxylate group, a quaternary amine group, or a benzyl group;
    and subsequently
    introducing a second conditioner having an active ingredient selected from the group consisting of: cellulose, a cellulose ether, methyl cellulose, polymethylcellulose, or a combination thereof, and having a weight average molecular weight of from about 1,000 Daltons to about 10,000,000 Daltons into the feed stream to return the detected removal efficiency to meet the control criterion.

3. A condition-in-place method of conditioning a reverse osmosis or nanofiltration membrane utilized for removing enteric viruses and other microbiological contaminants from water, the method comprising:
    introducing into the feed stream a first conditioner, which is a water soluble polymer selected from polyacrylamide and polyelectrolytes having a sulfate group, a sulfite group, a sulfide group, a nitrate group, a nitrite group, a carboxylate group, a quaternary amine group, or a benzyl group;
    and subsequently
    circulating a blend comprising water, an active ingredient selected from the group consisting of: cellulose, a cellulose ether, methyl cellulose, polymethylcellulose, or a combination thereof, and having a weight average molecular weight of from about 1,000 Daltons to about 10,000,000 Daltons, and a fluorescing substance through the membrane to improve removal efficiency of the fluorescing substance by the membrane;
    monitoring membrane performance via fluorometric measurement during the circulation of the blend by detecting removal of the fluorescing substance by the membrane; and
    circulating the blend until a control criterion of membrane performance is met;
    wherein the control criterion is a log removal value of at least 3.

4. The condition-in-place method of claim 3, further comprising purifying water utilizing the membrane after the circulation of the blend has been stopped.

5. The method of claim 1, wherein the membrane performance is monitored via fluorometric measurement of the feed stream, the permeate stream, and the reject stream.

6. The method of claim 1, wherein the membrane performance is monitored via fluorometric measurements of the feed stream and the permeate stream.

7. The method of claim 1, wherein the membrane performance is monitored via fluorometric measurement of the feed stream and the reject stream.

8. The method of claim 1, wherein the active ingredient is polymethylcellulose.

9. The method of claim 1, wherein the active ingredient is cellulose.

10. The method of claim 1, wherein the active ingredient is methyl cellulose.

11. The method of claim 2, wherein the active ingredient is polymethylcellulose.

12. The method of claim 2, wherein the active ingredient is cellulose.

13. The method of claim 2, wherein the active ingredient is methyl cellulose.

14. The condition-in-place method of claim 3, wherein the active ingredient is polymethylcellulose.

15. The condition-in-place method of claim 3, wherein the active ingredient is cellulose.

16. The condition-in-place method of claim 3, wherein the active ingredient is methyl cellulose.

* * * * *